Feb. 15, 1949.  V. E. VORHEES  2,461,710

DIAPHRAGM-TYPE SEAL

Filed Nov. 30, 1945

INVENTOR.
Vance E. Vorhees
BY Charles P. Vojtech
atty.

Patented Feb. 15, 1949

2,461,710

UNITED STATES PATENT OFFICE 2,461,710

DIAPHRAGM-TYPE SEAL

Vance E. Vorhees, Lincolnwood, Ill., assignor to Crane Packing Company, Chicago, Ill., a corporation of Illinois Application November 30, 1945, Serial No. 631,853

7 Claims. (Cl. 286—11)

This invention relates to fluid seals and particularly to fluid seals of the mechanical type wherein a seal is effected between relatively rotatable surfaces which are located in a radial plane.

The principal object of this invention is to provide an improved fluid seal for relatively low pressure applications which seal will be comprised of a minimum number of parts so that the cost thereof will be relatively low.

Another object of this invention is to provide a seal of the type described in which a hard sealing washer is positively interlocked with a retainer and which, except for the spring, will be self-contained and may be installed in place by a simple press-fit. The only metallic part, other than the spring, will be the retainer.

An important feature of this invention is a sealing member which may be made of flexible resilient material such as rubber, either natural or synthetic, or a silicone composition, the form of the sealing member being substantially washer-like so as to require either no molds at all for its formation or the simplest of two-part molds.

Another important feature of this invention is the provision, in a seal of the type described, of a sealing washer which is movable axially, but is interlocked mechanically with the remainder of the seal so as to be positively rotated or held therewith, said washer being sealed from the part to which it is interlocked by a diaphragm type of sealing element.

Figure 1:
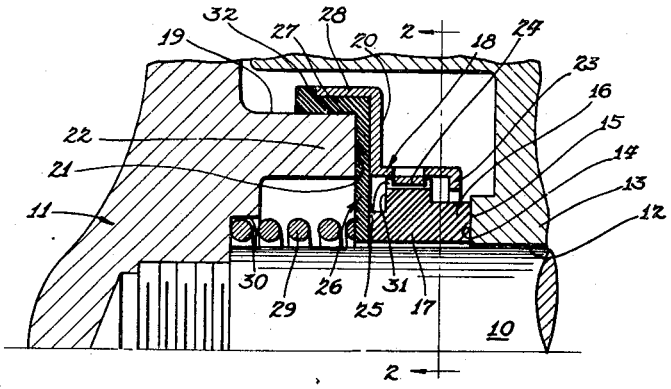
Figure 2:
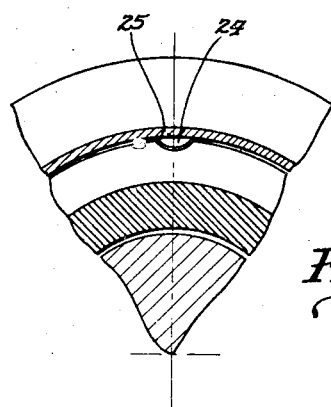
Figure 3:
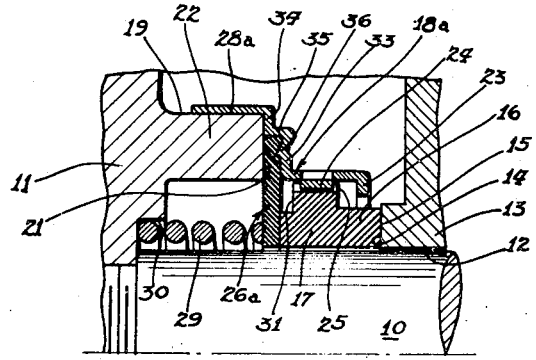

These and other objects and features of this invention will become apparent from the following description when taken together with the accompanying drawings, in which Fig. 1 is a fragmentary elevation in section of one form of fluid seal embodying this invention as shown applied to a water pump of an internal combustion engine;

Fig. 2 is a fragmentary section through the seal of Fig. 1 taken along line 2—2 of Fig. 1; and Fig. 3 is a fragmentary elevation of a modification showing a simple washer type of seal.

Referring now to Fig. 1 for a detailed description of the invention, there is shown a shaft 10 to which is secured the impeller 11 of a pump, only the hub of the impeller being shown for convenience. Said shaft 10 passes through an opening 12 in a housing 13 which is provided with a raised face 14 constituting one surface of the seal. The other surface 15 of the seal is formed on the end of a nose 16 extending laterally from a sealing washer 17, said washer being annular in shape and encircling shaft 10. The washer 17 is adapted to slide axially freely within a retainer 18 which is held frictionally upon an outer cylindrical surface 19 of an axially extending cup 22 in the impeller 11. The washer may be molded from any of the materials commonly used for this purpose such as that disclosed in U. S. Patent No. 2,326,000, issued on August 3, 1943, to C. P. Teeple.

Retainer 18 is formed at its mid-portion with a radially extending shoulder 20 which abuts the end 21 of the axially extending cup 22 on impeller 11. At its right-hand end (Fig. 1) retainer 18 is formed with an inwardly disposed flange 23 extending into the path of movement of washer 17. To the left of and immediately adjacent flange 23 (Fig. 1) two or more indentations 24 are formed which extend into corresponding axially disposed slots 25 formed in the periphery of washer 17, the indentations and slots constituting an axially slidable rotary driving connection between retainer 18 and washer 17. The slots 25 and indentations 24 are also shown in Fig. 2. It is understood that the clearance between washer 17 and retainer 18 is sufficiently great to permit free axial movement of washer 17 within the retainer and also a slight weaving of the washer within the retainer without impairing this free axial movement.

A fluid-tight seal is effected between retainer 18 and washer 17 by means of an apertured flexible resilient diaphragm 26 which may be made of rubber or rubber-like material, either synthetic or natural, or a combination of the two, the type of material used being dependent upon the nature of the fluid to be sealed. The diaphragm 26 has a flange 27 compressed upon the exterior 19 of cup 22 by a similar flange 28 formed in retainer 18, the inner end extending radially inwardly and having one face in contact with the back of washer 17.

The washer 17 is continuously urged to the right as viewed in Fig. 1 by a spring 29 which may be helical in form and which is centered at one end by a recess 34 formed in impeller 11. It is understood of course that other types of springs may be used in place of the helical spring 29. The force of spring 29 is utilized to maintain sealing surfaces 14 and 15 in contact with one another at all times. Thus as the sealing surfaces wear, washer 17 will be moved to the right as viewed in Fig. 1.

A fluid-tight seal is effected between retainer 18 and washer 17 by means of an apertured flexible resilient diaphragm 26 which may be made of rubber or rubber-like material, either synthetic or natural, or a combination of the two, the type of material used being dependent upon the nature of the fluid to be sealed. The diaphragm 26 has a flange 27 which is compressed upon the exterior surface 19 of cup 22 by a similar flange 28 formed in retainer 18, the inner end extending radially inwardly and having one face in contact with the back of washer 17. Said washer 17 is continuously urged to the right as viewed in Fig. 1 by a spring 29 which may be helical in form and which is centered at one end by a recess 30 formed in impeller 11. It is understood that other types of springs may be used in place of helical spring 29. The force of spring 29 is utilized to maintain sealing surfaces 14 and 15 in contact with one another at all times. Thus as the sealing surfaces wear, washer 17 will be moved to the right as viewed in Fig. 1 by the force of spring 29 thereby maintaining a fluid-tight seal between the rotating impeller 11 and the stationary housing 13.

The back surface 31 of washer 17 is relieved so that the washer may move freely back and forth in an axial direction in retainer 18 without interfering with the free swinging movement of diaphragm 26. The back surface 31 may be radially disposed as shown in Fig. 1 or it may be angularly disposed to facilitate molding of the washer.

Flange 27 of diaphragm 26 is provided with a head 31 which is utilized to draw the flange over surface 19. Thus in assembling the seal, the washer 17 is first inserted into retainer 18, care being taken to index slots 25 properly with respect to indentations or lug 24. Next, diaphragm 26 is inserted into retainer 18, flange 27 being pressed into flange 28 until bead 32 abuts the end of flange 28. Spring 29 is then inserted into recess 30 and the retainer and assembled diaphragm and washer are pressed upon the exterior surface 19 of cup 22 until the diaphragm strikes the end 21 of the cup. The seal is then ready for use.

In the modification shown in Fig. 3, the retainer and diaphragm have been modified so that the diaphragm 26a is in the form of a flat washer and the retainer 18a is pressed directly upon the exterior surface 19. It will be observed that diaphragm 26a extends only partly across the end surface 21 of the cup 22 and does not overlie surface 19. Retainer 18a is modified so that flange 28a contacts surface 19 with a press-fit sufficiently tight to resist all torque imposed thereon by washer 17. Two shoulders 33 and 34 are formed in the retainer 18, shoulder 34 abutting the end 21 of cup 22 and shoulder 33 abutting the side of diaphragm 26a. It is contemplated that the outside diameter of diaphragm 26a will be such that a press-fit will be established between the outer edge of the diaphragm and the inside of the step 35. It is contemplated further that the depth of the space between the end surface 21 of cup 22 and shoulder 33 will be slightly less than the thickness of the diaphragm so that the diaphragm will be compressed to form a fluid-tight connection between the cup and retainer. To insure a fluid-tight connection and also to assist in holding the diaphragm from being drawn radially inward by the movement of washer 17 a bead 36 may be formed in shoulder 33. The remainder of the seal is the same as that shown in Fig. 1, like reference characters referring to corresponding parts in Fig. 3.

In assembling the form shown in Fig. 3, the washer 17 is first inserted into retainer 18a with slots 25 indexed properly with respect to indentations 24, and then diaphragm 26a is pressed into shoulder 33. Spring 29 is placed in recess 30 and the flange 28a of the retainer is pressed upon the exterior surface 19 of cup 22. The seal is then ready for use.

It will be noted that since diaphragm 26a is a flat washer, it may be cut from sheet material, although considerable material could be saved by molding the washer. When formed by molding, only the simplest of two-part molds need be used.

Seals made in accordance with this invention are simple to manufacture and to install. They may be handled as two separate units, viz., the spring and the retainer, the washer and diaphragm in each case being held in the retainer either by friction or by mechanical means. The washer, although freely movable in the retainer in an axial direction, is nevertheless positively driven by the retainer so that no severe torque load is imposed upon the flexible diaphragm. They are well suited for use in water pumps such as are used in automobiles and in general in any place where a cylindrical surface is available upon which the retainer may be pressed. It is understood that the foregoing description is merely illustrative of preferred embodiments of the invention and that the scope of the invention therefore is not to be limited thereto, but is to be determined by the appended claims.

What is claimed is:

1. In a fluid seal for relatively rotatable structures, a retainer having axially spaced cylindrical portions, one portion being adapted for press fit with respect to one of the structures, a sealing washer within the other portion, a sealing diaphragm having radially outer and inner end regions, the outer end region being compressed against the retainer and the inner end region contacting the washer, an axially slidable rotary driving connection between the washer and said other portion, an inward radial projection on the said other portion extending into the path of movement of the washer to limit the axial movement thereof in one direction, a radially outwardly extending shoulder at one end of said other portion of the retainer for locating the retainer relative to said one structure, and resilient means acting against the said one structure and compressing the inner end of the diaphragm against the washer.

2. In a fluid seal for relatively rotatable structures, one of said structures having formed thereon a cup having substantially cylindrical inner and outer surfaces, a retainer having axially spaced cylindrical portions, one portion having a press fit with respect to one of the cylindrical surfaces on the cup, a sealing washer within the other portion, a sealing diaphragm having radially outer and inner end regions, the outer end region being compressed against the retainer and the inner end region contacting the washer, an axially slidable rotary driving connection between the washer and said other portion, an inward radial projection on the said other portion extending into the path of movement of the washer to limit the axial movement thereof in one direction, a radially outwardly extending shoulder at one end of said other portion of the retainer for locating the retainer with respect to the edge of the cup, and spring means within the cup and compressed between the cup and inner end of the diaphragm to form a fluid-tight connection between the diaphragm and washer.

3. The combination of a fluid seal as described in claim 1, said retainer cylindrical portions being of different diameters.

4. The combination of a fluid seal as described in claim 2, said retainer cylindrical portions being of different diameters such that the portion adapted for press fit surrounds the outside of the cup, and said diaphragm is provided with an axial flange which is adapted to be compressed between the last-mentioned retainer portion and the outside of the cup to form a fluid-tight seal thereat.

5. The combination of a fluid seal as described in claim 2, said retainer cylindrical portions being of different diameters such that the portion adapted for press fit is pressed directly upon the outside surface of the cup, and the radially outwardly extending shoulder is located between the cylindrical portions.

6. The combination of a fluid seal as described in claim 2, said retainer cylindrical portions being of different diameters such that the portion adapted for press fit is pressed directly upon the outside surface of the cup, and said radially outwardly extending shoulder is provided with an axial off-set such that the diaphragm is compressed between the axial off-set and the end of the cup, while the remainder of the flange contacts the end of the cup directly, thereby limiting the amount of compression to which the diaphragm is subjected.

7. The combination of a fluid seal as described in claim 1, said retainer cylindrical portions being of different diameters and said radially outwardly extending shoulder connecting the two portions.

VANCE E. VORHEES.

REFERENCES CITED

The following references are of record in the file of this patent:

UNITED STATES PATENTS

| Number | Name | Date |
|---|---|---|
| 1,931,723 | Fageal et al. | Oct. 24, 1933 |
| 2,118,027 | Barish | May 24, 1938 |
| 2,163,127 | Limpert | June 20, 1939 |
| 2,395,359 | Vedovell | Feb. 19, 1946 |

FOREIGN PATENTS

| Number | Country | Date |
|---|---|---|
| 274,040 | Great Britain | 1928 |